No. 746,703.

Patented December 15, 1903.

UNITED STATES PATENT OFFICE.

FRITZ HOFMANN, OF ELBERFELD, GERMANY, ASSIGNOR TO FARBENFABRIKEN OF ELBERFELD CO., OF NEW YORK, N. Y., A CORPORATION OF NEW YORK.

GERANIOL DERIVATIVE.

SPECIFICATION forming part of Letters Patent No. 746,703, dated December 15, 1903.

Application filed May 5, 1903. Serial No. 155,784. (No specimens.)

*To all whom it may concern:*

Be it known that I, FRITZ HOFMANN, doctor of philosophy, chemist, residing at Elberfeld, Germany, (assignor to the FARBENFABRIKEN OF ELBERFELD COMPANY, of New York,) have invented a new and useful Improvement in Geraniol Derivatives; and I hereby declare the following to be a clear and exact description of my invention.

My invention relates to the production of the hitherto unknown alpha-substituted derivatives of geraniol, having the following general formula:

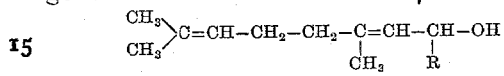

(R meaning an alkyl or alphyl radicle, such as methyl, ethyl, propyl, butyl, phenyl, tolyl, xylyl, or the like.)

According to my researches the new bodies can be produced by first treating citral ($C_{10}H_{16}O$) with the known additional products, which can be prepared by the action of halogen alkyls or halogen alphyls and an ether—*e. g.*, ethyl ether—on magnesium and then decomposing the resulting halogen-magnesium compounds with water. The new bodies thus obtained are limpid or yellow-colored oils, which split off water when heated with acids, unsaturated hydrocarbons being thus obtained. They possess an odor like that of rose-oil and can therefore be employed for the manufacture of artifical perfumes.

In carrying out my process practically I can proceed as follows, the parts being by weight: Into a vessel provided with a reflux condenser, a stirrer, and a dropping-funnel and containing two hundred and forty parts of magnesium filings a mixture of fourteen hundred and twenty parts of methyl iodid and fifteen hundred parts of ether (free from water) is dropped under cooling. A reaction sets in, the magnesium dissolves, the production of the additional compound having the formula

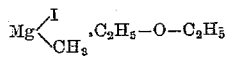

being the result. To the solution thus obtained a mixture of fourteen hundred parts of citral with fourteen hundred parts of ether is slowly added under cooling and stirring. The mixture thus obtained is then allowed to stand for some time, and after the reaction is finished the iodomagnesium compound of alpha-methylgeraniol, having the formula

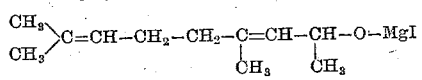

is decomposed by the addition of ice-water. The ethereal solution which contains the new body is dried over anhydrous sulfate of sodium, the ether is distilled off, and the residue thus obtained is then purified by fractional distillation *in vacuo*. The new alpha-methylgeraniol, having the formula

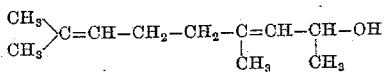

passes over at 112° to 113° centigrade under twelve millimeters' pressure. It is a limpid oil having a rose-like odor. When heated with acids, water is split off, dimethyl-2-6-nonatrien-2-6-8 of the formula

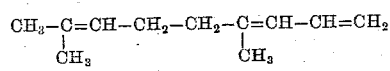

being obtained.

The process proceeds in an analogous manner if instead of methyl iodid, used in the above example, methyl bromid, ethyl iodid, bromo benzene, or the like be employed.

Having now described my invention and in what manner the same is to be performed, what I claim as new, and desire to secure by Letters Patent, is—

1. The herein-described new alpha-substituted geraniols having the above-given general formula and being from limpid to yellow oils which split off water when heated with acids, unsaturated hydrocarbons being produced, substantially as hereinbefore described.

2. The herein-described new alpha-methylgeraniol having the above-given formula, which is a limpid oil having a pleasant odor similar to that of rose-oil, boiling at 112° to 113° centigrade under twelve millimeters' pressure and splitting off water when heated with acids, dimethyl-2-6-nonatrien-2-6-8 being produced, substantially as hereinbefore described.

In testimony whereof I have signed my name in the presence of two subscribing witnesses.

FRITZ HOFMANN.

Witnesses:
   OTTO KÖNIG,
   J. A. RITTERSHAUS.